DAMPING MEANS FOR PORTABLE STRUCTURE
Original Filed July 19, 1967
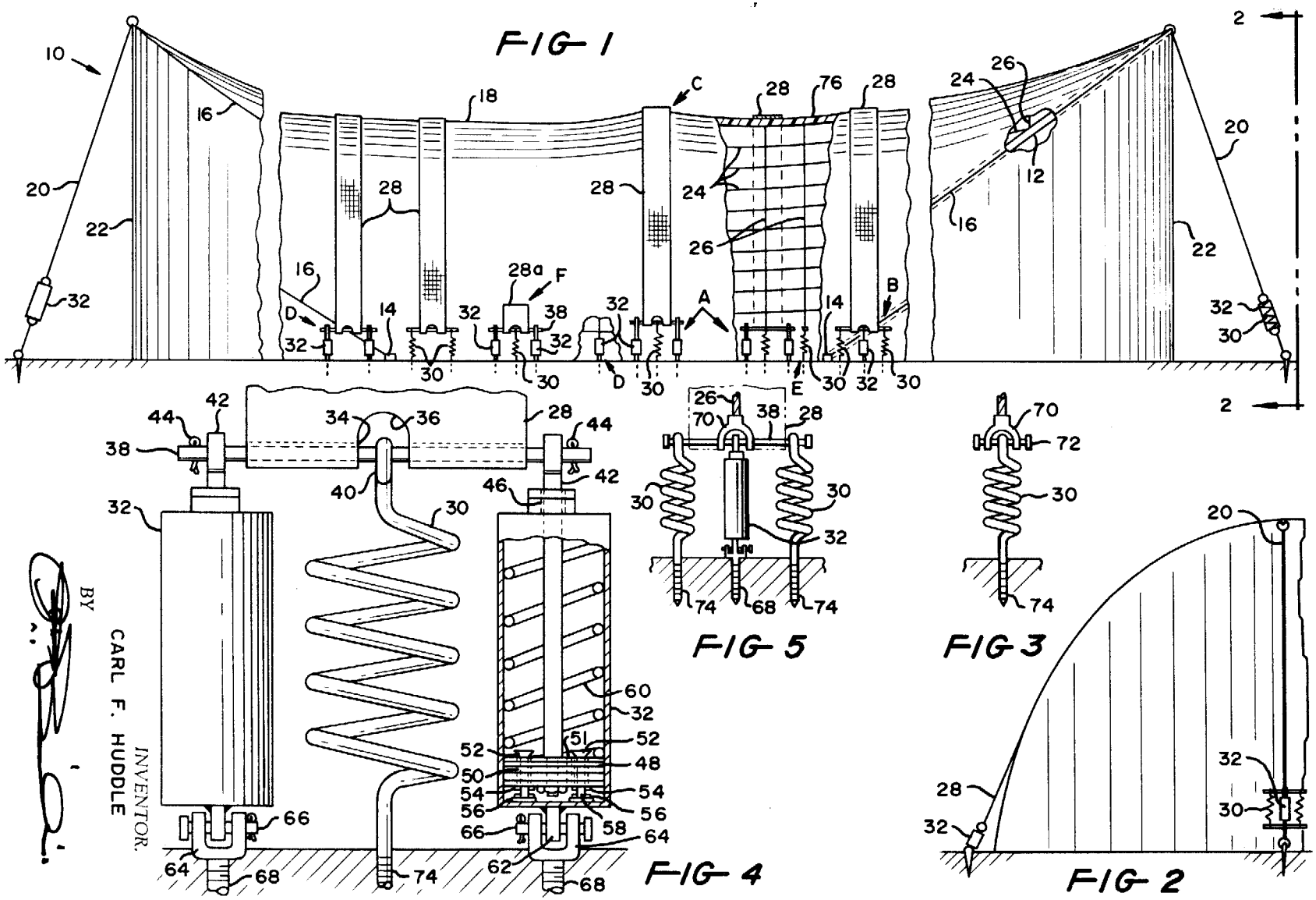
INVENTOR.
CARL F. HUDDLE
BY United States Patent Office Re. 28,012
Reissued May 21, 1974

28,012

DAMPING MEANS FOR PORTABLE STRUCTURE

Carl F. Huddle, Pleasant Ridge, Mich., assignor to Tension Structures Co.

Original No. 3,465,764, dated Sept. 9, 1969, Ser. No. 654,425, July 19, 1967. Application for reissue Feb. 26, 1971, Ser. No. 118,713
Int. Cl. E04b *1/347*
U.S. Cl. 135—1 R 6 Claims

Matter enclosed in heavy brackets [ ] appears in the original patent but forms no part of this reissue specification; matter printed in italics indicates the additions made by reissue.

ABSTRACT OF THE DISCLOSURE

A [portable semi-rigid] *tent-like* structure including a pair of arches inclined from a common base and pivotably tilted outward from each other, a flexible membrane attached to and stretched between the arches, longitudinal tension members secured to the arches to support the membrane, inverted tension members operatively connected to the longitudinal tension members and/or to the membrane to prevent ballooning thereof, and [vibration damping means including at least one of the following: (A) spring-loaded dash-pots connected between the inverted tension members and the base; (B) springs connected between the inverted tension members and the base; (C) bands connected between the base an the membrane in series with spring-loaded dash-pots; and (D) bands connected between the base and the membrane in series with springs] *means for damping flutter and vibration in the structure. The damping means may include a spring or springs and/or a spring-loaded dash-pot or dash-pots associated with the membrane and/or the tension members and the base in any of several ways.*

*The membrane may also be lined with a thicker layer of interstitial material which may also bond the tension members together and to the membrane.*

The present invention relates generally to improvements in novel architectural structures of the portable soft shell type illustrated and described in Pat. No. 3,215,153, issued in the name of Carl F. Huddle on Nov. 2, 1965. More particularly, the present invention relates to novel means for eliminating or diminishing vibrations and/or flutter in said structures.

Since these new soft shell structures can be of very lightweight construction, they are very susceptible to vibrations and flutter of the roof, end walls, and under certain conditions, vibration or shaking of the entire structure. The principal cause of such vibration is a pulsating wind force. Such flutter and vibration not only can cause damage to the structure and its contents, but could also cause the structure to fail structurally. Lightweight roofing materials such as membranes of plastic, fabric, treated paper and similar materails are especially vulnerable to damage by flapping, whipping or fluttering when excited by such pulsating wind forces. These seemingly minor vibrations could constitute the beginning of a resonance of harmonic period of vibration that ultimately causes the roof system to "gallop" and/or the entire structure to shake or vibrate in increasing tempo until damage or failure occurs. While such a condition may prevail for some time before damage or failure, it certainly would not be regarded as a safe condition, especially if such a structure were occupied by a public gathering. Sudden wind squalls, thunderstorms or even normal windy conditions can start such a vibratory condition. Once the structure or part of it reaches its natural frequency or even a harmonic frequency, the small pulsating wind forces serve to reinforce the frequency forces, amplifying the vibratory movement and its associated forces to objectionable and/or destructive states.

One known method of eliminating or diminishing some vibrations is to add mass to the system or parts thereof, but this defeats the purpose of the low-cost, portable, semi-permanent and easily erected and dis-assembled structure described in above-mentioned patent.

Accordingly, the principal object of this invention is to provide a system of damping that can be directly or indirectly applied to such lightweight membrane structures that *without increasing their mass* will prevent destructive vibrator action therein and make them safe for public use as well as for the shelter of property.

Another object of this invention is to provide such a system which automatically compensates for changes in [elongation] *the length* of the structural members *of such structures* due to stress and/or temperature changes, the later, of course, changing from night to day and from season to season.

A further object of this invention is to provide such a system which prevents "local" flutter or whipping of light membrane material.

A more specific object of this invention is to provide such a system which comprises spring loaded dash-pot means which may include a spring arrangement in parallel therewith.

Other objects and advantages of this invention will become apparent from the following detailed description taken in conjunction with the accompanying drawings, wherein:

FIG. 1 is a side elevation view [in partial cross section] illustrating a typical architectural structure embodying the invention *with parts broken away and in section;*

FIG. 2 is a fragmentary end view taken along the line 2—2 of FIG. 1 and looking in the direction of the arrows;

FIG. 3 is an enlarged fragmentary view of [a portion of] *one of the damping means shown in* FIG. 1;

FIGS. 4 and 5 illustrate optional embodiments of the [invention] *damping means* incorporated in the FIG. 1 structure.

Referring now to the drawings in greater detail, FIG. 1 illustrates an architectural structure 10 in the erected or assembled condition and embodying the invention. As was indicated in Pat. No. 3,215,153, the structure 10 may range from a relatively small shelter to a comparably large structure covering, for example, a stadium or an arena. The structure 10 comprises two or more [arcuate] *curved* arch members 12 pivotally connected at their lower ends to a support frame 14 in the manner described in the above-mentioned patent. The arch members 12 extend outwardly from [the center] *spaced intermediate portions* of the structure 10 at a suitable angularly inclined position [defining the terminal edges 16] *and with other elements* of the structure 10 *define the limits and contour of the structure.*

[The] *To* peripheral portions *16* of the arch members 12 [are] *is* connected [to] a suitable *flexible* roofing material 18 which extends therebetween and is maintained under controlled tension defining the roof line of the structure. [Further rigidity] *The stability* of the structure is [achieved] *enhanced,* if desired, by employing suitable anchoring means such as columns or cables 20 which are connected to the arch members 12 at one end [thereof restraining further angular pivoting movement of the arch members] *and to the frame 14 or the ground at the other end* and [maintaining] *maintain* the roofing material 18 under the prescribed tension *and may also restrain further downward pivoting movement of the arch members. To the same end, there may also be provided transverse anchoring or restraining means such as the inverted tension members 26 hereinafter further referred to.*

Where protection or covering in addition to the [extended] roofing material 18 is desired, end walls or curtains 22 may be employed, extending around all or a portion of the open ends of the structure 10 and [suspending] *depending* from the arch members 12. If desired, the end walls 22 may be of a structural material and anchored at the lower ends thereof so as to serve as restraining means in lieu of employing the columns or cables 20.

The combination of curved arches 12 [, member 18 and positioning or] *and* anchoring [system] *systems 20 (or 22) and 26* produce a warped surface in the *roofing material* or membrane 18.

In some structures, particularly the larger ones, it is desirable to support the membrane 18 by longitudinal tension members 24 extending between *and suitably attached to* the arches 12. The membrane 18 and the members 24 can be preloaded or shaped by the inverted tension members 26 *which overlie the members 24 and are also attached to the arches or to the frame 14 or the ground between the arches.* Either or both the members 24 and 26 can be attached to the membrane 18 to help hold it in place. In other words, the members 26 may act just the opposite of the members 24, the latter providing support for the membrane 18 and the former holding the membrane 18 and/or the members 24 down *and tensioning them,* tending to prevent "ballooning," *flutter and vibration.*

In applications where the membrane 18 is used alone between the arches 12 (*i.e., the members 24 and 26 are not employed*) or where it is unattached to the members 24 and/or 26, it may be desirable to use inverted hold down members, such as wide bands 28 positioned over the membrane 18 to prevent ballooning, *flutter or vibration* and to serve as part of a [dampening] *damping* system as will be described below.

Inasmuch as the structure 10 is interconnected by elastic components, it will *flutter or* vibrate in part or in total when it is disturbed from its equilibrium status, such as by a wind force. In lieu of the known method of adding mass to the structure 10 to eliminate or dimnish *flutter and* vibrations, the members 24 and 26 may be pre-tensioned. However, both the main tension support members 24, as well as the inverted members 26, must be increased in size as the pre-tensioning forces are increased in value to support a given roof [( or end wall)] load.

Some improvement in the diminution of *flutter or* vibration [periods] may also be accomplished by uneven spacing [and] *and/or* uneven tensioning of these resilient members *24, 26 and 28.* Nevertheless, the complete [system] *structure,* and parts thereof, *will* still have a natural period of vibration with accompanying harmonic frequencies which may be objectionable. These frequencies [still] *will* depend on the mass, the preloading, the geometric configuration, and the forces acting on structure 10.

In accordance with the invention, a simpler, more efficient and more economical means for eliminating or diminishing *flutter or* vibrations comprises spring mechanisms 30 of varying stiffness *through which the members 20 and 28 and the members 26 which are not attached to the arches are attached to the frame 14 or the ground,* serving to provide uneven tensioning to members 26 [or] *and* 28. The [mechanisms] *mechanism* 30 may operate alone (FIGS. 1 and 3), or in parallel (FIGS. 1, 2, 4 and 5) [,] with [a] dash-pot [mechanisms] *mechanism* 32 *which are also attached to the frame 14 or the ground,* as an additive to any or all the members 20, 26 and 28. *Alternatively, as shown at D in FIG. 1, the dash-pot mechanisms may be used alone.* The dash-pot 32 and/or the spring [mechanisms] *mechanism* 30 may be connected to the *members 20 and 26 and* [band] *bands* 28 by any convenient means, such as [that] *those* illustrated in [FIG. 4] *the drawing.* As illustrated *in FIG. 4,* the band 28 may include a lateral [opening] *tunnel* 34 formed [through] *in* the end thereof. The band 28 may further include a centrally located [semi-circular] cut-out portion 36 *in the end thereof which intersects the tunnel.* A [rod] *shaft 38* may [be mounted] *extend* through the [opening] *tunnel* 34 [such that] *and* a looped end 40 of the spring 30 [is connected thereto] *which is located* in the cut-out portion 36 and [shafts] *so connect the spring to the band. The ends of the shaft 38 also extend through eyes on the ends of rods* 42 extending from the upper ends of a pair of dash-pot mechanisms 32 *and* are so connected to the ends thereof.

The [rod] *shaft* 38 may be retained in place by [cottor] *cotter* pins 44 positioned through openings in the [rod] *shaft* 38 exterior the [shafts] *rods* 42.

The [shaft] *rod* 42 is slidably mounted through an opening 46 formed through the upper end of the dash-pot mechanism 32. The lower end of the [shaft] *rod* 42 is fixedly connected to a piston 48 which is slidably mounted within the cylindrical dash-port 32. A plurality of openings 50 and 51 are formed longitudinally through the piston 48.

Valves 52 are urged toward a closed position in the openings 50 by springs 54 mounted between the underside of the piston 48 and flanges 56 formed on stems 58 extending from the valves 52 through the openings 50 *and 51.*

A spring 60 is mounted around the [shaft] *rod* 42 with the dash-pot cylinder 32, urging the piston 48 toward a downward position. The cylinder 32 is filled with any suitable fluid, such as oil. The cylindrical housing 32 is anchored to the *frame 14 or other* mounting surface by any suitable means, such as by a boss 62, a yoke 64 and a pin 66 mounted therethrough. The yoke 64 may have a stem 68 extending downwardly therefrom for insertion into the *mounting* surface.

It should be noted that the band 28 may [be] either [loosely fitted over] *just extend around* the membrane 18 or *be* attached thereto, or, *as shown at F in FIG. 1,* may consist of a short strap *28a* connected to each side of the membrane 18.

Preferred embodiments are illustrated in FIGS. 4 and 5 and at A and B, respectively, in FIG. 1, wherein a single spring mechanism 30 may be mounted between two dash-pot mechanisms 32, or a single dash-pot mechanism 32 may be mounted between two spring mechanisms 30. Either the FIG. 4 structure or the FIG. 5 structure may be connected to a band 28 or an inverted tension member 26 *or a cable 20.* As illustrated in [FIG.] *FIGS. 2 and 5,* the *cable 20 or the* member 26 may be connected to the shaft 38 by means of a yoke 70. Such a yoke 70 would suffice for connection with the spring 30 of FIG. 3 via a shorter pin 72. The spring may be anchored *to the frame 14 or the ground* by a stem 74.

Referring once again to FIG. 4, it may be noted that when pull is exerted on the band 28, *the members 26 or the cables 20* [the rod 38] *as by "ballooning" of the membrane 18,* (see C, FIG. 1), the shaft [42] *38, the rods 42* and the [piston] *pistons* 48 will be lifted *extending the spring 30,* compressing the [spring] *springs* 60 and [causing] *permitting the spsings 54 to close* the valves 52 [to close], thereby forcing the fluid *above the pistons* to move downwardly through the *restricted* [opening] *openings* 51. Once the upward force on the band 28 subsides, the valves 52 will open under the downward force of the [spring] *springs 30 and* 60 *and the upward*

*force of the fluid below the pistons,* allowing fluid to return [therethrough, as well as] *relatively freely* through the [opening] *openings 50 and* 51, in the usual dash-pot damping manner, i.e., the force is directly proportional to velocity. In other words, the faster a force atempts to move the membrane 18 and band 28 in an upward direction, the more difficult it is to move it, by virtue of the A or B (FIG. 1) assemblies *and thus ballooning, flutter and vibration are minimized.*

In either of these combinations, the spring 30 may or may not be required. For larger structures 10, the spring 30 is essential, due to the greater forces and weights involved. In smaller structures, the spring 60 within the dash-pot assembly 32 will suffice. If desired, the spring 30 may be positioned around the dash-pot mechanism 32.

As indicated above, [when the structure 10 is large enough to warrant the use of the inverted tension members 26,] either the A or B dash-pot assembly may be used to provide the fluid or viscous-damping described above. In some instances, springs 30 ([FIG.] *FIGS. 1 (at E) and* 3) alone may sufficiently diminish vibrations, particularly when they are of different sizes to provide [variable] *different* tensioning of the members *20,* 26 *or 28.*

To supplement the above embodiments, an asbestos flocking or foamed plastic spray 76, such as polyurethane foam, *of greater thickness than the membrane 18* may be employed, as illustrated in FIG. 1, *to line the membrane 18 and* [fuse] *bond* the members 18, 24 and 26 together, particularly when the structure 10 is a semi-permanent type. Such a lining 76 also serves, *by itself,* to prevent "local" flutter or whipping of the membrane 18 when the membrane is of a light material.

It should be apparent from the above description that the invention not only provides a novel means for eliminating objectionable and possibly destructive vibratory movements *or flutter* of large soft shell structures which are subjected to wind forces, but also an automatic means for compensating for changes in elongation of structural members due to stress or temperature changes.

It should be further apparent that the combined dash-pot and spring assembly, whether it be the A or B version, could be connected to only one end of an individual band, with the other end thereof connected directly to the base *on which the structure is mounted.*

It should also be apparent that the invention provides additional means for eliminating even "local" flutter or whipping of the membrane.

While but [two] *three* embodiments, along with possible supplemental features, of the invention have been shown and described for purposes of illustration, it is apparent that other modifications of the invention may be possible within the scope of the appended claims.

I claim:

1. A portable structure comprising a plurality of arch members each terminating in end portions for pivotal engagement with the base on which the structure is to be mounted; a substantially inextensible roofing system extending between and connected to said arch members, said roofing system including roof support tension members connected between said arch members inverted tension members operatively connected to said support tension members, and a membrane supported thereby; a plurality of anchors attached respectively to said arch members and adapted to be disposed in tension and to be connected to said base, the arrangement being such that when said roofing system is tensioned said arch members are inclined outwardly and that each of said arch members can be pulled downwardly by the anchors in opposition to tension in said roofing system when the structure is erected; and means operatively connected between said roofing system and said base for diminishing vibrations in said roofing system resulting from wind forces, said vibration diminishing means including dash-pot means and connector means for operatively connecting said dash-pot means to said roofing system, and spring means mounted in parallel with said dash-pot means.

2. A portable structure comprising a plurality of arch members each terminating in end portions for pivotal engagement with the base on which the structure is to be mounted, a substantially inextensible and continuous roofing fabric extending between and connected to said arch members, a plurality of anchors attached respectively to said arch members and adapted to be disposed in tension and to be connected to said base, the arrangement being such that when the roofing fabric is tensioned the arch members are inclined outwardly by the anchors in opposition to tension in said roofing fabric when the structure is erected and spring-loaded dash-pots operatively connected between said roofing fabric and said base for tensioning said roofing fabric transversely of the longitudinal extent thereof.

3. The structure described in claim 2, including additionally, a supporting tension system and an inverted tension system, operatively connected to each other and to said arches to support said roofing fabric.

4. A portable structure comprising a plurality of arch members each terminating in end portions for pivotal engagement with the base on which the structure is to be mounted, a substantially inextensible roofing material extending between and connected to said arch members, a plurality of anchors attached respectively to said arch members and adapted to be disposed in tension and to be connected to said base, the arrangement being such that when the roofing material is tensioned the arch members are inclined outwardly and that each of said arch members can be pulled downwardly by the anchors in opposition to tension in said roofing material when the structure is erected, and means operatively connected between said roofing material and said base for diminishing vibrations in said roofing material resulting from wind forces, said means including a plurality of bands positioned on said roofing material and acting transversely to the longitudinal extent thereof, and spring-loaded dash-pot means connected between said base and at least one end of said bands.

5. A portable structure comprising a plurality of arch members each terminating in end portions for pivotal engagement with the base on which the structure is to be mounted, a substantially inextensible roofing material extending between and connected to said arch members, a plurality of anchors attached, respectively to said arch members and adapted to be disposed in tension and to be connected to said base, the arrangement being such that when the roofing material is tensioned the arch members are inclined outwardly and that each of said arch members can be pulled downwardly by the anchors in opposition to tension in said roofing material when the structure is erected, and means operatively connected between said roofing material and said base for diminishing vibrations in said roofing material resulting from wind forces, said means including at least one band positioned on said roofing material and acting transversely to the longitudinal extent thereof and spring-loaded dash-pot means connected between said base and at least one end of said band.

*6. A portable structure comprised of a plurality of arches with curved bights disposed at a distance from each other so as to form a vaulted framework and terminating in end portions for pivotal attachment to the base on which the structure is to be mounted; a substantially inextensible but flexible roofing membrane extending between and connected to said arches and to said base that is inwardly concave between the bights of said arches; one of said arches being movable away from the other to tension said membrane between said arches and said base, means for holding arches apart to keep the membrane under tension, and at least one spring loaded dash-pot attaching said membrane to said base between said arches to dampen vibrations in said roofing membrane.*

(References on following page)

References Cited

The following references, cited by the Examiner, are of record in the patented file of this patent or the original patent.

UNITED STATES PATENTS

| | | | |
|---|---|---|---|
| 3,388,711 | 6/1968 | Huddle | 135—1 R |
| 3,034,606 | 5/1962 | Wiegand | 52—146 X |
| 2,988,096 | 6/1961 | Otto | 135—1 R |

| | | | |
|---|---|---|---|
| 2,299,078 | 10/1942 | Craig et al. | 135—1 R |
| 3,215,153 | 11/1965 | Huddle | 135—1 R |
| 2,827,138 | 5/1962 | Roy | 135—1 X |

FOREIGN PATENTS

| | | | |
|---|---|---|---|
| 982,670 | 1/1951 | France | 135—1 R |

KENNETH DOWNEY, Primary Examiner